Oct. 31, 1933.  O. JANSSEN  1,933,143

TRANSMISSION

Filed June 15, 1932   5 Sheets-Sheet 1

Oscar Janssen,
Inventor.
Delos G. Haynes
Attorney

Oct. 31, 1933.  O. JANSSEN  1,933,143
TRANSMISSION
Filed June 15, 1932   5 Sheets-Sheet 2

Oct. 31, 1933.  O. JANSSEN  1,933,143
TRANSMISSION
Filed June 15, 1932   5 Sheets-Sheet 3

Oscar Janssen,
Inventor.
Delos G. Haynes.
Attorney.

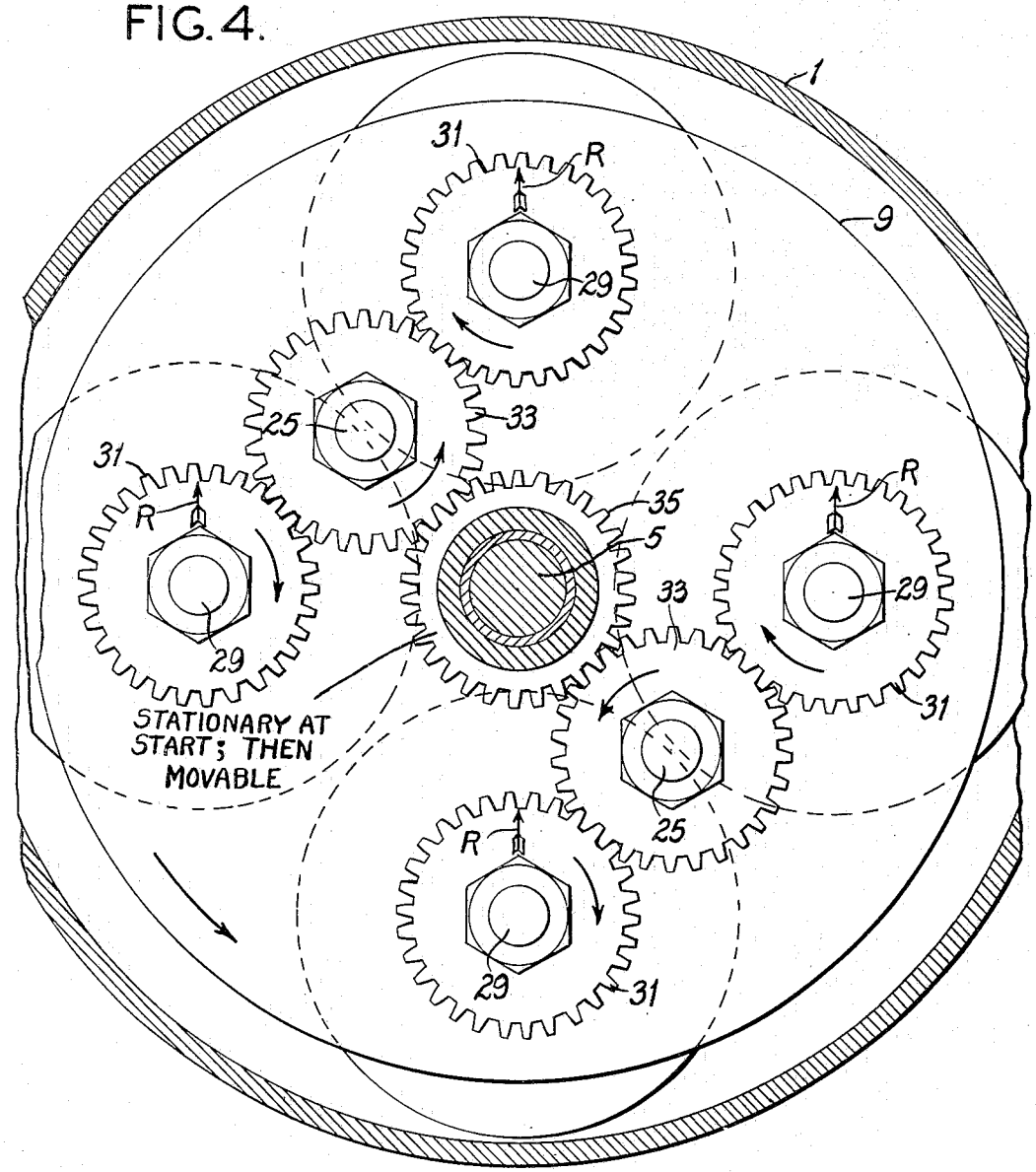

Oct. 31, 1933.    O. JANSSEN    1,933,143
TRANSMISSION
Filed June 15, 1932    5 Sheets-Sheet 5

Oscar Janssen
Inventor
Delos G. Haynes
Attorney

Patented Oct. 31, 1933

1,933,143

UNITED STATES PATENT OFFICE 1,933,143

TRANSMISSION

Oscar Janssen, St. Louis, Mo.

Application June 15, 1932. Serial No. 617,286

5 Claims. (Cl. 74—34)

This invention relates to transmissions, and with regard to certain more specific features, to a power transmission adapted to automatically adjust the mechanical advantage between a prime mover and driving element so that the speed-torque characteristics of the former are adapted to those of the latter.

Among the several objects of the invention may be noted the provision of a transmission which automatically adjusts the mechanical advantage between a prime mover and a driven element so that during operating periods the speed-torque characteristics of the prime mover shall be automatically adapted to those of said driven element; the provision of a transmission of the class described which shall under accelerating conditions automatically and without special manipulation change said mechanical advantage throughout an infinite number of gradually varying steps in response to the requirements of the driven member; and the provision of apparatus of the class described which shall be simple and compact in form, rugged in construction, and which may be economically manufactured and maintained. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated one of various possible embodiments of the invention, Fig. 1 is a longitudinal section of the transmission;

Fig. 4 is a cross section taken on line 4—4 of Fig. 1;

Similar reference characters indicate corresponding parts throughout the several views of the drawings.

Figure 1:
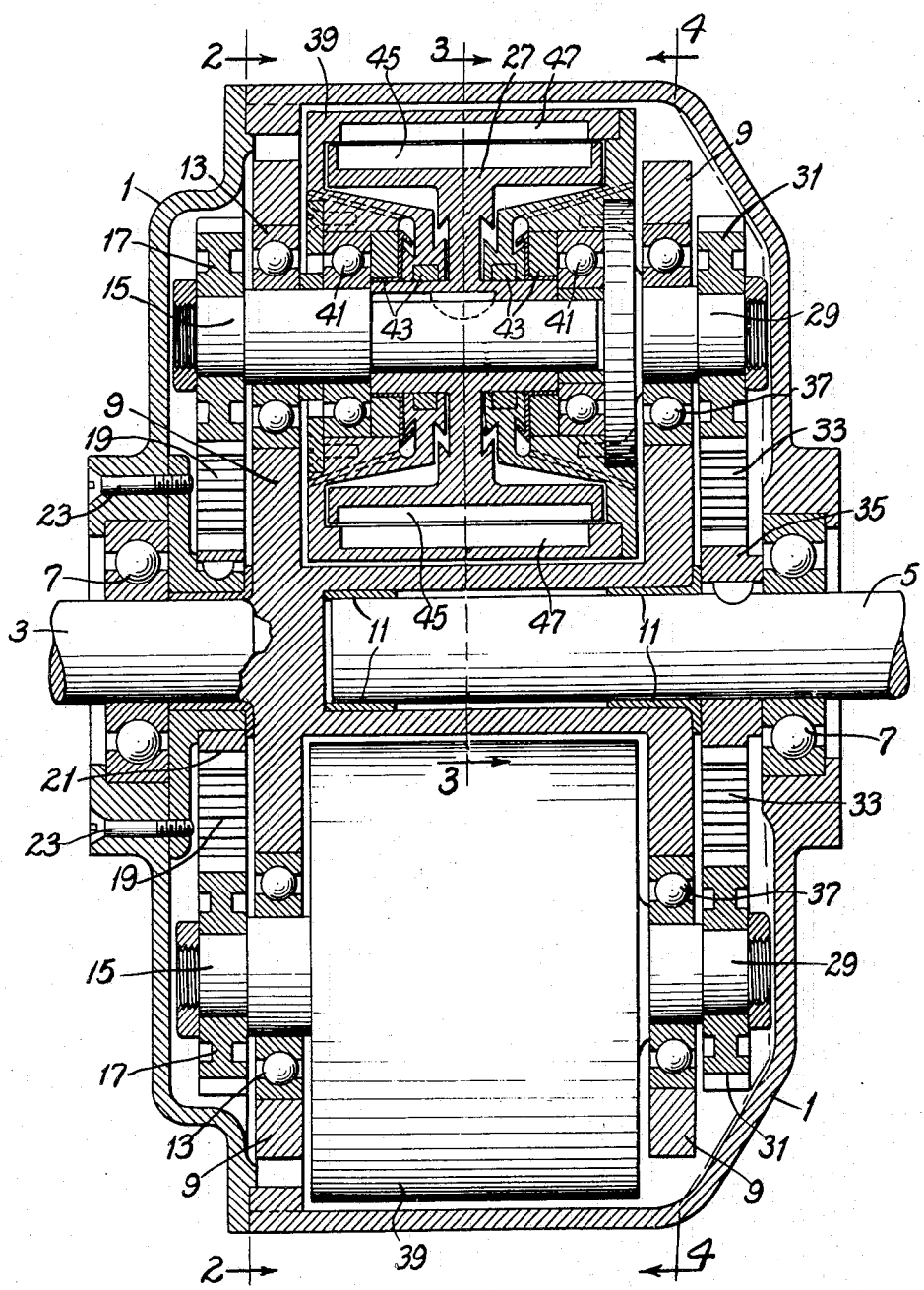

Referring now more particularly to Fig. 1, there is shown at numeral 1 a stationary casing adapted to be fastened to a suitable frame such as the frame of a vehicle. The reference herein to a vehicle to which the transmission is to be applied is merely exemplary, and it is to be understood that other devices may be driven by means of the transmission. It is particularly effective, however, in adapting the relatively limited effective speed-torque ranges of internal combustion engines, turbines and the like to the effectively wide speed-torque ranges of machines such as road vehicles and others.

At numeral 3 is shown a driving member coupled to the prime mover (not shown). A driven member 5 is coupled to the element to be driven such as the driving wheels of the vehicle (not shown). The driving members 3 and the driven member 5 both rotate with respect to the case 1 on suitable bearings 7 and with respect to one another, as will be shown.

Attached to the driving shaft 3 is a cage 9, the same being rotatable with said driving shaft 3. Said cage 9 rides on bearings 11, thereby permitting relative rotation with respect to said driven shaft 5.

Figure 5:
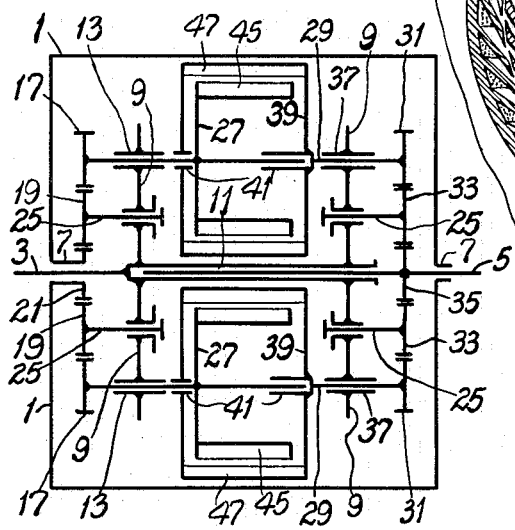
Fig. 5 is a sectional diagram of certain elements of the invention corresponding to the detailed section of Fig. 1.

The cage 9 carries in bearings 13 a set of trunnions 15 on the outer ends of which are epicyclic gears 17. The gears 17 are in mesh with idler gears 19, said idler gears 19 in turn meshing with a fixed gear 21 attached to said case 1 by means of machine screws 23. Fig. 5 will aid in making the above clear.

Figure 2:
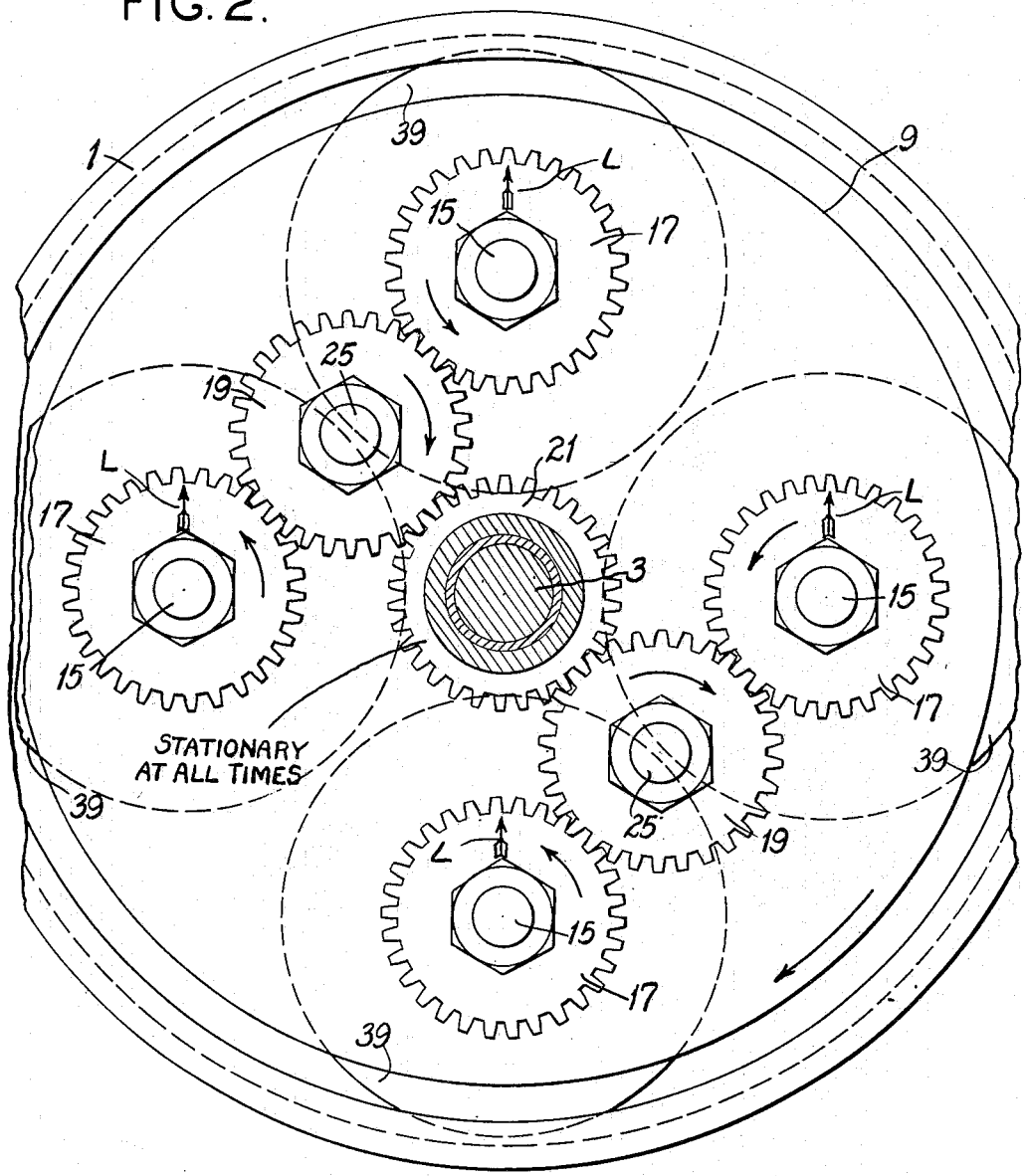
Fig. 2 is a cross section taken on line 2—2 of Fig. 1.

It will be understood that the idler gears 19 are held to the cage 9 by means of suitable studs such as shown at numeral 25 (Fig. 2). Furthermore, inasmuch as a plurality of trunnions are desirable on the cage 9, and four is such a suitable number, one idler 19 may be used for gearing two of the gears 17 to the stationary gear 21. It will be understood that any suitable number of these units may be used in the cage, including an odd number, in which case one idler is used for each gear 17.

Each trunnion 15 carries a bucket wheel 27, the wheel being fastened thereto, so that upon rotation of the cage 9 the bucket wheel 27 is epicyclically turned through the action of its respective epicyclic gear trains 17, 19, revolving on gear 21.

The cage also carries an equal plurality of trunnions 29 having fastened thereto gears 31 which, by way of idlers 33, rotatable on the cage 9, and a gear 35, are epicyclically articulated with the driven member 5 to which said gear 35 is fastened. The arrangement of the epicyclic gears 31, 33 and 35 is clearly shown in Fig. 4, and is similar to the arrangement of the epicyclic gears for the trunnions 15 shown in Fig. 2. The only difference is that the gear 21 of the train of Fig. 2 is stationary at all times; whereas the corresponding gear 35 of the train shown in Fig. 4 is movable with the driven shaft 5 and stationary only when said shaft 5 is stationary.

Returning to the trunnions 29, it will be seen that they are held in bearings 37 in the cage 9. The trunnions 29 also carry an exterior bucket wheel 39, with suitable bearings 41 between said bucket wheel 39 and the trunnions 15, whereby relative rotation is permitted between the trunnions 15 with their interior bucket wheels 27 on the one hand, and the trunnions in 29 with their exterior bucket wheels 39 on the other hand.

Suitable packing means 43 is employed between the bucket wheels 27 and 39 for the purposes of preventing outward leakage of mercury carried in said wheels 27 and 29 and inward leakage of oil.

Figure 3:
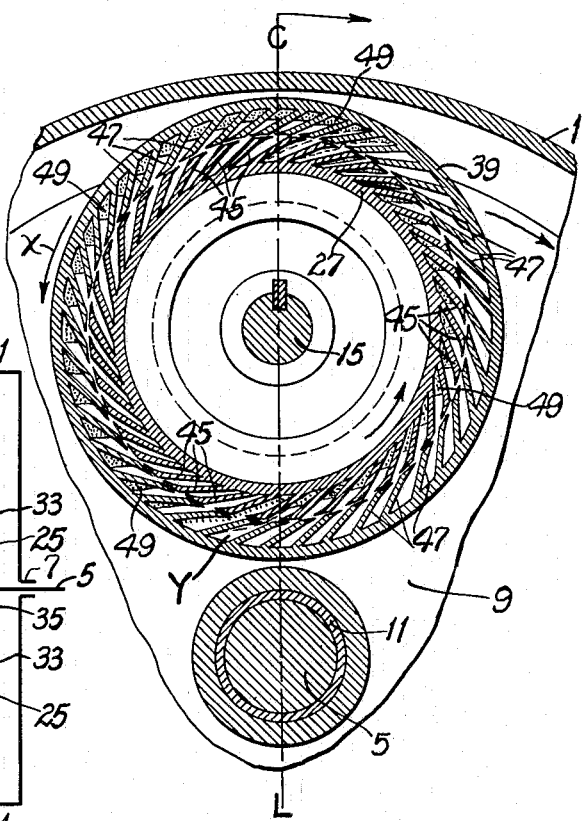
Fig. 3 is a fragmentary cross section taken on line 3—3 of Fig. 1.

Referring now to Fig. 3, it will be seen that each interior bucket wheel 27 carries a series of angularly arranged and peripherally located tangential buckets or blades 45. These blades forming the bucket are directed clockwise in Fig. 3.

The exterior bucket wheels 39 have a corresponding series of inwardly directed tangential buckets or blades 47 having a general counter-clockwise direction (Fig. 3).

The driving connection between the power input shaft and the power output shaft comprises a mass 49 of mercury or the like activated in buckets 45 and 47 in a manner which will be described. In order that this mass may be properly activated the gears 17 and 21 have equal numbers of teeth so that upon rotation of the cage 9 said gears 17, although they revolve about the gear 21 and rotate on their own axes, they do not rotate with respect to the case 1, that is to say, a direction arrow on any of said gears 17 will maintain parallel positions throughout an entire revolution (see direction arrows L in Fig. 2).

Fig. 4 also shows that the gears 31 and 35 have equal numbers of teeth, so that direction arrows R on gears 31 remain parallel throughout a cycle as long as the gear 35 is stationary.

The sizes of the idlers 19 and 33 is immaterial because they do not affect the values of their respective gear trains but merely their respective directions of action.

The operation is as follows, assuming clockwise rotation of the cage 9 (or viewed in Fig. 2; counterclockwise in Fig. 4).

The idlers 19 roll on the stationary gear 21 and move clockwise, thereby driving the gears 17 counterclockwise on their own axes, but one revolution of the cage 9 causes one rotation of each gear 17 on its own axis, in view of the one to one ratio between gears 17 and 21. Thus the gears 17 do not rotate with respect to the frame 1.

The result of the above is that the bucket wheel 27 does not rotate with respect to the frame 1. Centrifugal force (Fig. 3) will tend to throw the mercury radially with respect to the cage 9.

The mercury will therefore be trapped in the right-hand series of buckets 45 in wheel 27 (Fig. 3) and will be projected from the left-hand series of the same wheel 27, center line CL being used as a reference. In fact, projection will start somewhat to the right of the center line CL. Thus there is a counterclockwise torque on the bucket wheel 27 tending to rotate the respective gear 17 in a counterclockwise direction on its own axis which is the direction of motion imposed upon said gear by the rotation of the cage 9 by way of the gear train 17, 19, 21.

The charge of mercury which is leaving the left-hand buckets 45 under centrifugal force is projected into the left-hand buckets 47 of the outer bucket wheel 39, thus tending to drive the same around in a clockwise direction against the normal direction of turning thereof which is counter-clockwise (Fig. 3).

Referring again to Fig. 3, it will be seen that as motion proceeds, the mass of mercury which was trapped in the inner buckets 45 at the right of center line CL becomes positioned nearer to the center line CL and thus as center line CL swings clockwise, this mercury finally reaching a point where it also is thrown from said bucket into the bucket 47.

The cage 9 at the start and through the cycling effect of gears 31 and 33 on the gear 35 which is stationary, causes said mercury which is thrown out at the left of center line CL into the outer buckets 47 to be picked up and brought inwardly over the path indicated by the arrow "X" (Fig. 3). But this mercury has a normal tendency to move outwardly, due to centrifugal force, the force being proportional to the square of the angular velocity of cage 9.

Thus there is a resistance to the tendency of the epicyclic train 31, 33 to freely roll on gear 35. That is to say, there is a tendency to lock said train 31, 33 against free rolling action due to the motion of the cage 9. Inasmuch as this locking action is substantially proportional to the square of the angular velocity of the cage 9, it can be effectively built up. Hence, if the speed of the input shaft 3 is doubled, the locking force on the gear train 31, 33 and 35 is quadrupled, and thus the driving torque on shaft 5 quadrupled.

Thus it is clear that the locking force on train 31, 33, 35 is a function of the speed of the input shaft 3 and inasmuch as said shaft can have its speed varied according to an infinite number of infinitesimally small increments, the torque exerted against shaft 5 may be built up in such increments until the resisting torque on shaft 5 is gradually overcome, thus providing gradual and easy but positive starting. Furthermore, as the resisting torque is overcome, the output shaft 5 accelerates until balanced conditions are obtained, as under conditions of constant velocity of the vehicle in which the transmission is used.

The construction may be epitomized as follows: A power transmission is effected comprising a driving member 3, a driven member 5, said members being relatively rotatable within the fixed member 1. Between these driving and driven members is articulated means comprising the two epicyclic gear trains with their respective bucket wheels for controlling a free mass such as the mercury. This control is such as to constrain said free mass to move in a curved path; whereas otherwise, it would move tangentially due to the centrifugal force. The action of the bucket wheel 39 in drawing in the mass during one part of the cycle of operation is resisted by the centrifugal force of said mass so that an action is effected on the driven member, due to the braking action on the otherwise freely rotating output upper cycling gear train 31, 33 and 35.

After a given mass of the mercury has been released, as when the bucket 47 comes to the innermost point of travel with respect to the shafts 3 and 5, then the mass of mercury is released into the bucket 47 (see point Y, Fig. 3).

During the remainder of the cycling movement of the mercury, the centrifugal force is applied tending to turn the bucket wheel 27 in a counterclockwise direction. During the last-named movement, the centrifugal force sets up an action on the driving means which, while it necessarily does not increase the available energy, does tend to counter-balance the reaction on the driving means caused by the said braking action placed upon the train 31, 33. It will be understood that when the train 31, 33 is resisted in its rolling action, or tends to be locked as above described, that the resulting driving action on gear 35 and shaft 5 takes place with attendant reaction on the cage 9 and hence on the input power shaft. This balance, while not complete, is substantial, and becomes more and more complete as the pitch radii of the buckets 45 and 47 are more closely equalized. The said reaction also grows according to the square of the angular velocity of shaft 3, as does the action causing the reaction.

It will be seen from the above that each pocket full of the mercury may be treated as a single mass which during outward movement along its curved path effects a counterbalancing action on the reaction effected when the load is picked up on the outward movement, said last-named reaction being due to the centrifugal force of the mass of mercury during its inward movement over the curved path of "X". It will of course be understood that in respect to a given mass the action is sequential but referring to the aggregate action of the number masses, the action and reaction is substantially continuous.

Figure 6:
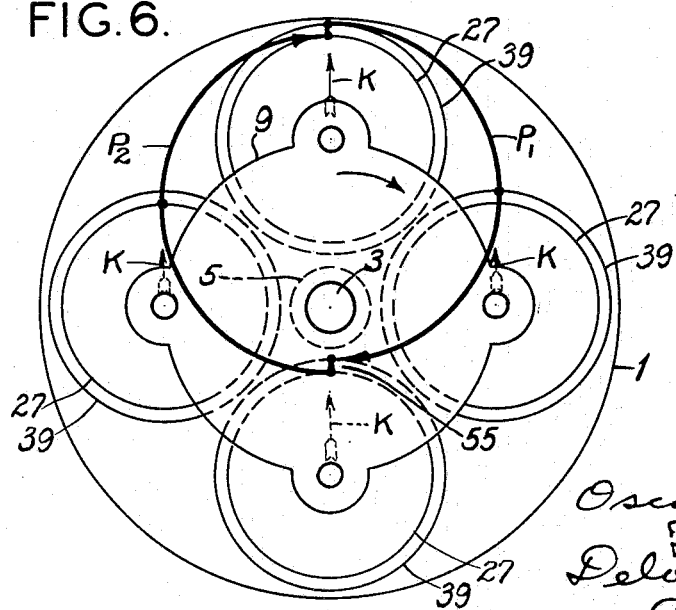
Fig. 6 is a kinematic diagram illustrating certain motions viewed from the end of the apparatus.

For clarity, in Fig. 6 is shown diagrammatically a series of positions of the bucket wheels 27 and 39 with an approximate ideal path $P_1$, $P_2$ of a given mass of mercury. The conditions are represented as at the start of motion, gear 35 being locked by the load on shaft 5. The directional arrows K, L drawn on the bucket wheels 27, 39, respectively remain parallel to themselves. The shaft 5 is stationary as is the gear 21, and hence, the bucket wheel 39 has a lack of rotation with respect to the frame 1, that is, at the start of operations.

A mass of mercury in the outer bucket wheel 39 will take the absolute path $P_1$ and in doing so, is drawn closer and closer to the shaft 5 and this indrawing is done against the centrifugal force of the mercury on the left side of center line CL and in the left-hand buckets 47 of the outer wheel 29 (see also Fig. 3), and this accounts for the braking action on the output epicyclic gear train 31, 33 whereby that train is caused to tend to drive the gear 35 and shaft 5. At or about point 55 (Fig. 6), the mercury shifts from the outer bucket wheel 39 to the inner bucket wheel 27, this being done by means of the centrifugal force.

In the inner bucket wheel 27, the mercury takes the absolute path $P_2$ which is directed away from the center of shafts 3 and 5 and hence, in the direction of the centrifugal force. At this time, the material is on the right side of the radial center line CL (Fig. 3) of the bucket wheel so that the torque aids the input power torque and tends to counterbalance the reaction on the cage 9 caused by the locking train 31, 33, 35.

In other words, the mercury is drawn in while in the wheel 39 against centrifugal force, the indrawing being caused by the shaft 5 being stationary and by the train 31, 33. Inasmuch as this indrawing is resisted, there is set up an action tending to drive said shaft 5 which, as above stated, is greater according to the square of the angular speed of rotation of the shaft 3 and cage 9. This, of course, entails a reaction on the driving shaft 3 which is substantially counterbalanced by the aiding action of the centrifugal force of the mass along the path 57 when in the inner bucket wheel 27 the counterbalancing action being also according to the square of the same angular speed.

In Fig. 6, the offset between the path $P_1$ and $P_2$ indicates approximately the region at which shift from the bucket 39 to 27 and vice versa is made. It is to be understood that Fig. 6 represents ideal conditions eliminating such features as lag, friction and the like. This is for the purpose of clarity in the description and it will be understood that the offset may occur a few degrees earlier or later than is shown, depending upon design characteristics. It will also be understood that other mechanism may be used to accomplish the principles of the invention.

Figure 7:
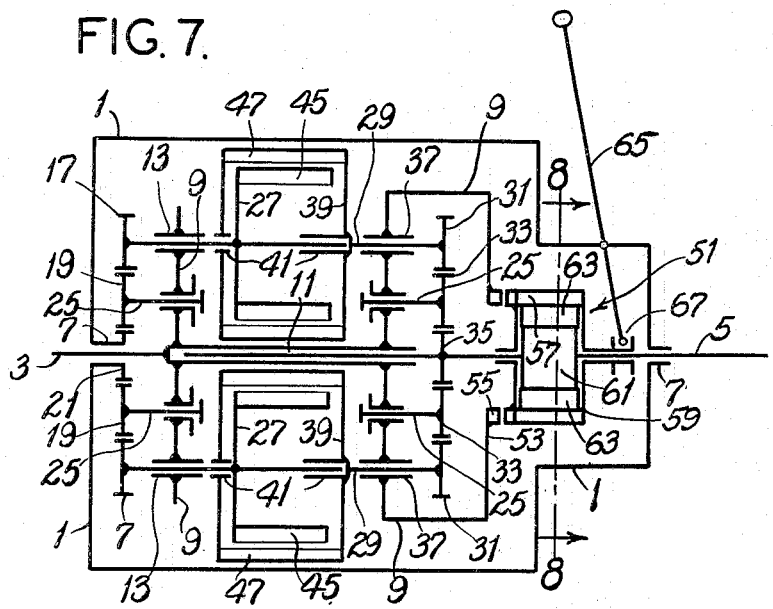
Fig. 7 is a view similar to Fig. 5 showing the application of an overrunning clutch, the same being in open position and inoperative.
Figure 9:
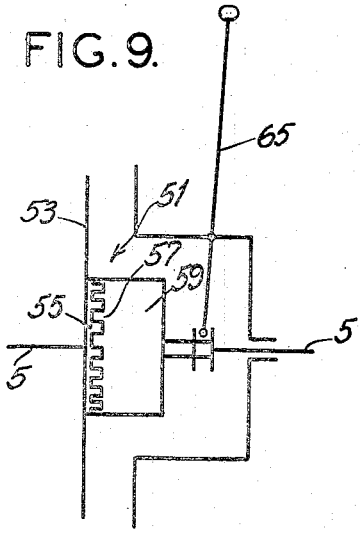
Fig. 9 is a diagram illustrating said clutch locked so as to become operative.
Figure 8:
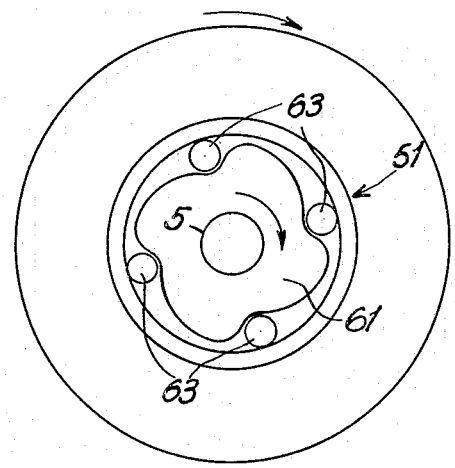
Fig. 8 is a cross section taken on line 8—8 of Fig. 7 showing certain details of said overrunning clutch.

It may be noted that the driven member 5 overruns the driving member 3 as when the vehicle coasts, thus providing a free-wheeling effect. If this feature is not desirable at all times an overrunning clutch 51 may be used which, however, is inserted reversely to that which is usual. This construction is shown in Figs. 7 to 9 and comprises an extension 53 from the cage 9 which carries teeth 55 of a crown coupling. Opposite teeth 57 are formed on a clutch cage 59, the latter, when disconnected as in Fig. 7, rotating freely on the driven shaft 5. Interiorly of the cage 59 the shaft 5 is provided with a clutch dog 61 and locking rollers 63 are positioned between the dog 61 and clutch cage 51.

Operation is as follows:

Under driving conditions, the device operates as already herein described when the crown coupling is disconnected as shown in Fig. 7 and when coasting occurs, the driven shaft 5 overruns the engine shaft 3.

When the crown coupling is closed as in Fig. 9, and coasting occurs, the driven shaft 5 overruns the drive shaft 3, causes the dog 61 to overrun the clutch cage 51, as shown in Fig. 8, thus wedging the rollers 63 and driving the cage 9 through the crown couplings 55, 57. This effects a lock and the cage 9 being attached to the drive shaft 3, thereby effects a lock between said shafts 5 and 3, thus eliminating the former free wheeling action. The lever 65 operating a yoke-and-collar combination 67 provides means for obtaining or dispensing with free wheeling operation.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A power transmission comprising a stationary frame, a driving member, a driven member, a cage driven by said driving member, epicyclic gear trains mounted respectively between the stationary member and cage and the driven member and cage, associated means driven respectively by said trains, a mass controlled by said associated means and centrifugal force induced by rotation of said cage, the portion of said associated means driven by the driven member train forcing said mass inwardly against said centrifugal force to tend to lock said train and cause a driving action on the driven member, and the portion of said associated means driven by the train to the stationary frame controlling said mass upon its outward centrifugal movement, the said portions of the associated means cooperating by means of substantially tangential recesses in each to transfer said mass.

2. A power transmission comprising a stationary frame, a driving member, a driven member, a cage driven by said driving member, epicyclic gear trains mounted respectively between the stationary member and cage and the driven member and cage, associated means driven respectively by said trains, a mass controlled by said associated means and centrifugal force induced by rotation of said cage, the portion of said associated means driven by the driven member forcing said mass inwardly against said centrifugal force to tend to lock said train and cause driving action on the driven member, and the portion of said associated means driven by the train to the stationary frame controlling said mass upon its outward centrifugal movement, the said portions of the associated means cooperating by means of substantially tangential recesses to transfer said mass, the cage effecting a reaction on the driver due to said action on the driven member, and said mass in the said second-named means thereby effecting a substantially balancing action on the driving member against the reaction thereon.

3. A transmission comprising a frame, a driving member, a driven member, a mass revolving under centrifugal force, containers for said mass each having substantially tangential recesses for transferring said mass, a cage driven by the driving member supporting said containers, means articulating one container with the driven member and means articulating the other container to the driving member, the driven-member container controlling the mass to direct the same inwardly against centrifugal force whereby free articulation is resisted and an action is effected through said articulation to the driven member, said mass under the action of said centrifugal force moving to the other container and causing the same through said articulation to the driving member to effect a substantially balancing action on the driving member against reaction transmitted thereto from the driven member by way of said cage.

4. A transmission comprising a frame, a driving member, a driven member, a revolving mass under centrifugal force, a pair of containers controlling the movement of said mass each having substantially tangential and oppositely directed recesses for transferring said mass, a cage driven by the driving member and rotatingly supporting said containers, an epicyclic gear train articulating one container with the driven member and a second epicyclic train articulating the other container with the driving member, the driven-member container controlling the mass to direct the same inwardly against centrifugal force, whereby there is effected a tendency to lock the driven-member epicyclic train to the driven member to cause rotation of said driven member, said mass under the action of said centrifugal force being adapted to move to the other container to move the same so as to drive the other epicyclic gear train to effect a substantially balancing action on the driving member against reaction from the driven member.

5. A transmission comprising a frame, a driving member, a driven member, a mass revolving under centrifugal force, containers for said mass, the walls of which are relatively fixed on the respective containers which they serve, a cage driven by the driving member supporting said container, means articulating one container with the driven member and means articulating the other container to the driving member, the driven-member container controlling the mass to direct the same inwardly against centrifugal force whereby free articulation is resisted and an action is effected through said articulation to the driven member, said mass under the action as said centrifugal force moving to the other container and causing the same through its articulation to the driving member to effect a substantially balancing action on the driving member against reaction transmitted thereto from the driven member by way of said cage.

OSCAR JANSSEN.